United States Patent
Dalal et al.

(10) Patent No.: US 10,649,924 B2
(45) Date of Patent: May 12, 2020

(54) NETWORK OVERLAY SYSTEMS AND METHODS USING OFFLOAD PROCESSORS

(71) Applicant: Xockets, Inc., San Jose, CA (US)

(72) Inventors: Parin Bhadrik Dalal, Milpitas, CA (US); Stephen Paul Belair, Santa Cruz, CA (US)

( * ) Notice: Subject to any disclaimer, the term of this patent is extended or adjusted under 35 U.S.C. 154(b) by 115 days.

(21) Appl. No.: 15/396,323

(22) Filed: Dec. 30, 2016

(65) Prior Publication Data

US 2017/0237703 A1 Aug. 17, 2017

Related U.S. Application Data

(63) Continuation of application No. 13/921,059, filed on Jun. 18, 2013.
(Continued)

(51) Int. Cl.
*H04L 29/12* (2006.01)
*G06F 13/16* (2006.01)
(Continued)

(52) U.S. Cl.
CPC ........ *G06F 13/1652* (2013.01); *G06F 9/3877* (2013.01); *G06F 13/16* (2013.01); *G06F 13/285* (2013.01); *G06F 13/362* (2013.01); *G06F 13/4022* (2013.01); *G06F 13/4068* (2013.01); *G06F 15/161* (2013.01); *G06F 15/17337* (2013.01); *H04L 29/08135* (2013.01); *H04L 29/08549* (2013.01); *H04L 47/2441* (2013.01); *H04L 47/56* (2013.01); *H04L 47/624* (2013.01); *H04L 47/6295* (2013.01);
(Continued)

(58) Field of Classification Search
CPC ............ G06F 13/1652; G06F 13/4068; G06F 13/285; G06F 13/4022; H04L 47/2441; H04L 47/624; H04L 47/56; H04L 47/6295; H04L 61/2592; H04L 61/103
See application file for complete search history.

(56) References Cited

U.S. PATENT DOCUMENTS 4,894,768 A 1/1990 Iwasaki et al.
6,157,955 A 12/2000 Narad et al.
(Continued)

OTHER PUBLICATIONS

WIPO, Written Opinion of the International Searching Authority for PCT Application PCT/US2015/023746, dated Sep. 15, 2015.
(Continued)

*Primary Examiner* — Hassan Kizou
*Assistant Examiner* — Hector Reyes (57) ABSTRACT

A network overlay system can include a data transport module having a network interface and a translation module configured to generate offload processing addresses for the network packet data; a system bus; at least one host processor connected to the system bus; and at least one offload processor module coupled to the system bus and configured to receive network packet data associated. Offload processor modules include processing circuits associated with at least one of the offload processing addresses that are configured to encapsulate the network packet data for transport on a logical network or decapsulate the network packet data received from the logical network. The offload processing circuits encapsulate or decapsulate network packet data independent of any host processor.

20 Claims, 5 Drawing Sheets

Related U.S. Application Data (60) Provisional application No. 61/753,901, filed on Jan. 17, 2013, provisional application No. 61/753,906, filed on Jan. 17, 2013, provisional application No. 61/753,892, filed on Jan. 17, 2013, provisional application No. 61/753,899, filed on Jan. 17, 2013, provisional application No. 61/753,903, filed on Jan. 17, 2013, provisional application No. 61/753,895, filed on Jan. 17, 2013, provisional application No. 61/753,910, filed on Jan. 17, 2013, provisional application No. 61/753,904, filed on Jan. 17, 2013, provisional application No. 61/753,907, filed on Jan. 17, 2013.

(51) Int. Cl.

| | | |
|---|---|---|
| *G06F 13/362* | (2006.01) | |
| *H04L 12/875* | (2013.01) | |
| *H04L 12/863* | (2013.01) | |
| *H04L 12/861* | (2013.01) | |
| *H04L 12/851* | (2013.01) | |
| *G06F 9/38* | (2018.01) | |
| *G06F 15/16* | (2006.01) | |
| *G06F 15/173* | (2006.01) | |
| *H04L 29/08* | (2006.01) | |
| *G06F 13/40* | (2006.01) | |
| *G06F 13/28* | (2006.01) | |
| *H04L 12/931* | (2013.01) | |

(52) U.S. Cl.
CPC ........... *H04L 49/90* (2013.01); *H04L 61/103* (2013.01); *H04L 61/2592* (2013.01); *H04L 67/10* (2013.01); *H04L 67/1097* (2013.01); *H04L 49/40* (2013.01); *H04L 61/6086* (2013.01); *Y02D 10/14* (2018.01); *Y02D 10/151* (2018.01)

(56) References Cited

U.S. PATENT DOCUMENTS

| | | | |
|---|---|---|---|
| 6,446,163 | B1 | 9/2002 | Hazelzet et al. |
| 6,794,896 | B1* | 9/2004 | Brebner ............... H04L 45/742 326/37 |
| 7,436,845 | B1 | 10/2008 | Rygh et al. |
| 7,831,745 | B1* | 11/2010 | Eiriksson ............. G06F 13/28 710/22 |
| 8,072,887 | B1 | 12/2011 | Siva et al. |
| 8,149,834 | B1 | 4/2012 | Nielsen et al. |
| 8,635,417 | B2 | 1/2014 | Morrison et al. |
| 8,825,900 | B1 | 9/2014 | Gross, IV et al. |
| 8,885,334 | B1 | 11/2014 | Baxter |
| 8,924,606 | B2 | 12/2014 | Akiyama et al. |
| 8,990,799 | B1 | 3/2015 | Forecast |
| 9,250,954 | B2 | 2/2016 | Dalal et al. |
| 9,258,276 | B2 | 2/2016 | Dalal |
| 9,286,472 | B2 | 3/2016 | Dalal et al. |
| 9,288,101 | B1 | 3/2016 | Dalal et al. |
| 9,348,638 | B2 | 5/2016 | Dalal et al. |
| 9,378,161 | B1 | 6/2016 | Dalal et al. |
| 9,436,638 | B1 | 9/2016 | Dalal et al. |
| 9,436,639 | B1 | 9/2016 | Dalal et al. |
| 9,436,640 | B1 | 9/2016 | Dalal et al. |
| 9,460,031 | B1 | 10/2016 | Dalal et al. |
| 9,495,308 | B2 | 11/2016 | Dalal |
| 9,558,351 | B2 | 1/2017 | Dalal et al. |
| 9,619,406 | B2 | 4/2017 | Dalal |
| 9,665,503 | B2 | 5/2017 | Dalal |
| 2004/0024915 | A1 | 2/2004 | Abe |
| 2004/0133720 | A1 | 7/2004 | Slupsky |
| 2004/0187122 | A1 | 9/2004 | Gosalia et al. |
| 2004/0202319 | A1 | 10/2004 | Hussain et al. |
| 2005/0038946 | A1 | 2/2005 | Borden |
| 2005/0226238 | A1 | 10/2005 | Hoskote et al. |
| 2007/0016906 | A1 | 1/2007 | Trauben et al. |
| 2007/0079185 | A1 | 4/2007 | Tololos, Jr. |
| 2007/0097130 | A1 | 5/2007 | Margulis |
| 2007/0115983 | A1 | 5/2007 | Yadlon et al. |
| 2007/0294433 | A1 | 12/2007 | Leigh |
| 2008/0027920 | A1 | 1/2008 | Schipunov et al. |
| 2008/0304481 | A1 | 12/2008 | Gurney et al. |
| 2009/0254719 | A1 | 10/2009 | Sasage |
| 2010/0031235 | A1 | 2/2010 | Adams et al. |
| 2010/0232548 | A1 | 9/2010 | Bolan et al. |
| 2010/0312913 | A1 | 12/2010 | Wittenschaleger |
| 2011/0035540 | A1 | 2/2011 | Fitzgerald et al. |
| 2011/0099317 | A1 | 4/2011 | Nishtala et al. |
| 2011/0103259 | A1 | 5/2011 | Aybay et al. |
| 2012/0047126 | A1 | 2/2012 | Branscome et al. |
| 2012/0076006 | A1 | 3/2012 | DeCusatis |
| 2012/0096211 | A1 | 4/2012 | Davis et al. |
| 2012/0131306 | A1 | 5/2012 | Bratt et al. |
| 2012/0151004 | A1* | 6/2012 | Pope ................... G06F 13/102 709/219 |
| 2012/0250682 | A1 | 10/2012 | Vincent et al. |
| 2013/0031390 | A1 | 1/2013 | Smith, III et al. |
| 2013/0179435 | A1 | 6/2013 | Stadter |
| 2013/0219168 | A1 | 8/2013 | Gearhart et al. |
| 2013/0290462 | A1 | 10/2013 | Lim et al. |
| 2014/0115282 | A1 | 4/2014 | Natkovich et al. |
| 2014/0157287 | A1 | 6/2014 | Howes et al. |
| 2014/0181319 | A1 | 6/2014 | Chen et al. |
| 2014/0204099 | A1 | 6/2014 | Ye |
| 2014/0201314 | A1 | 7/2014 | Borkenhagen |
| 2014/0250202 | A1* | 9/2014 | Hefty ..................... G06F 13/24 709/212 |
| 2016/0306667 | A1 | 10/2016 | Burger et al. |

OTHER PUBLICATIONS

WIPO, International Search Report for PCT Application PCT/US2015/023746, dated Sep. 15, 2015.
WIPO, Written Opinion of the International Searching Authority for PCT Application PCT/US2015/023730, dated Jul. 23, 2015.
WIPO, International Search Report for PCT Application PCT/US2015/023730, dated Jul. 23, 2015.
Miyashiro et al., DIMMnet-2: A Reconfigurable Board Connected to a Memory Slot, International Conference on Field Programmable Logic and Applications, 2006, Aug. 28-30, 2006, Madrid, Spain.
Tanabe et al., Preliminary Evaluations of a FPGA-based-Prototype of DIMMnet-2 Network Interface, Proceedings of the Innovative Architecture for Future Generation High-Performance Processors and Systems (IWIA '05), 2005.
Plessl et al., TKDM—A Reconfigurable Co-processor in a PC's Memory Slot, IEEE International Conference on Field-Programmable Technology (FPT), 2003, Dec. 17, 2003, Tokyo, Japan.
Tanabe et al., Prototyping on Using a DIMM Slot as a High-Performance I/O Interface, Proceedings of the Innovative Architecture for Future Generation High-Performance Processors and Systems (IWIA '03), 2003.
Tong et al., A System Level Implementation of Rijndael on a Memory-slot based FPGA Card, IEEE International Conference on Field-Programmable Technology (FPT), 2002, Dec. 16-18, 2002, Hong Kong, China.
Leong et al., Pilchard—A Reconfigurable Computing Platform with Memory Slot Interface, Proceedings of the 9th Annual IEEE Symposium on Field-Programmable Custom Computing Machines (FCCM '01), 2001.

\* cited by examiner

NETWORK OVERLAY SYSTEMS AND METHODS USING OFFLOAD PROCESSORS

PRIORITY CLAIMS

This application is a continuation of U.S. patent application Ser. No. 13/921,059, filed Jun. 18, 2013, which claims the benefit of U.S. Provisional Patent Applications 61/753,892 filed on Jan. 17, 2013, 61/753,895 filed on Jan. 17, 2013, 61/753,899 filed on Jan. 17, 2013, 61/753,901 filed on Jan. 17, 2013, 61/753,903 filed on Jan. 17, 2013, 61/753,904 filed on Jan. 17, 2013, 61/753,906 filed on Jan. 17, 2013, 61/753,907 filed on Jan. 17, 2013, and 61/753,910 filed on Jan. 17, 2013, the contents all of which are incorporated by reference herein.

TECHNICAL FIELD

Described embodiments relate to network overlay services that are provided by a memory bus connected module that receives data packets and can route them to general purpose offload processors for packet encapsulation, decapsulation, modification, or data handling.

BACKGROUND

Modern computing systems can support a variety of intercommunication protocols. In certain instances, computers can connect with each other using one network protocol, while appearing to outside users to use another network protocol. Commonly termed an "overlay" network, such computer networks are effectively built on the top of another computer network, with nodes in the overlay network being connected by virtual or logical links to the underlying network. For example, some types of distributed cloud systems, peer-to-peer networks and client-server applications can be considered to be overlay networks that run on top of conventional Internet TCP/IP protocols. Overlay networks are of particular use when a virtual local network must be provided using multiple intermediate physical networks that separate the multiple computing nodes. The overlay network may be built by encapsulating communications and embedding virtual network address information for a virtual network in a larger physical network address space used for a networking protocol of the one or more intermediate physical networks.

Overlay networks are particularly useful for environments where different physical network servers, processors, and storage units are used, and network addresses to such devices may commonly change. An outside user would ordinarily prefer to communicate with a particular computing device using a constant address or link, even when the actual device might have a frequently changing address. However, overlay networks do require additional computational processing power to run, so efficient network translation mechanisms are necessary, particularly when large numbers of network transactions occur.

SUMMARY

This disclosure describes embodiments of systems, hardware and methods suitable for high speed and/or energy efficient processing of packet data that does not necessarily require access to computing resources of a host processor of a server, server rack system, or blade server. In certain embodiments, a network overlay system is capable of processing network packets having network identifier tags. A data transport module is configurable to direct network packets based on network identifier tags, while an offload processor module connected to a memory bus and at least one offload processor is capable of modifying segregated network packets. A memory bus is connected between the data transport module and the at least one offload processor to support transport of network packets to the offload processor for modification.

In other embodiments, the data transport module includes an address translation module; a network card programmable to identify packets with a network identifier tag; or an IOMMU to translate virtual addresses to corresponding physical addresses. Typically the memory bus can support a double data rate protocol (e.g., DDR3, its predecessors or successors), but in alternative embodiments other memory protocols are used. In still other embodiments that include a network overlay for switched networks, data can be processed if the switched network data is first converted into packets.

In certain other embodiments, a memory bus connected module can provide network overlay services using multiple offload processors connected to the memory bus connection. In certain embodiments, the memory bus connected module can be mounted in a memory bus socket such as a dual in line memory module (DIMM) socket. Each offload processor can be capable of converting incoming packets having a first network protocol to outgoing packets having a second network protocol, with the ordering of network packet conversion by respective task execution of the multiple offload processors being determined by suitable control logic. Typically, the control logic can include a scheduler that updates task ordering in response to changes in network packet data flow. In other embodiments, a memory local to the module can be connected to a memory controller and accessible by the multiple offload processors. An arbiter can be used to prevent local memory access conflicts, and a switch controller can be used to improved performance by providing efficient context switching of the general purpose offload processors as required.

This disclosure also describes methods for processing network packets. Network packets can be received from a first network, and transported over a memory bus to an offload processor. The packets can be modified using the offload processor, and transported back over the memory bus to a second network. For example, packets conforming to a specific protocol such as Internet Protocol version 6 (IPv6) can be modified to conform to IP version 4 (IPv4) protocols, or vice versa. Alternatively headers can be modified, packets encapsulated or decapsulated, or data contained within the packets can be inspected, copied, or modified.

BRIEF DESCRIPTION OF THE DRAWINGS

FIG. 1-0 shows a system according to an embodiment.
FIG. 1-1 shows a system flow according to an embodiment.
FIG. 1-2 shows a method of providing network overlay services according to a particular embodiment.
FIG. 1-3 shows a data transport system providing network overlay services according to an embodiment.
FIGS. 2-0 to 2-3 show processor modules according to various embodiments.
FIG. 2-4 shows a conventional dual-in-line memory module.
FIG. 2-5 shows a system according to another embodiment.

DETAILED DESCRIPTION

Various embodiments of the present invention will now be described in detail with reference to a number of drawings. The embodiments show processing modules, systems, and methods in which offload processors are included on offload modules that connect to a system memory bus. Such offload processors are in addition to any host processors connected to the system memory bus, and can operate on data transferred over the system memory bus independent of any host processors. In particular embodiments, offload processors have access to a low latency memory, which can enable rapid storage and retrieval of context data for rapid context switching. In very particular embodiments, processing modules can populate physical slots for connecting in-line memory modules (e.g., dual in line memory modules (DIMMs)) to a system memory bus.

Figure 10:
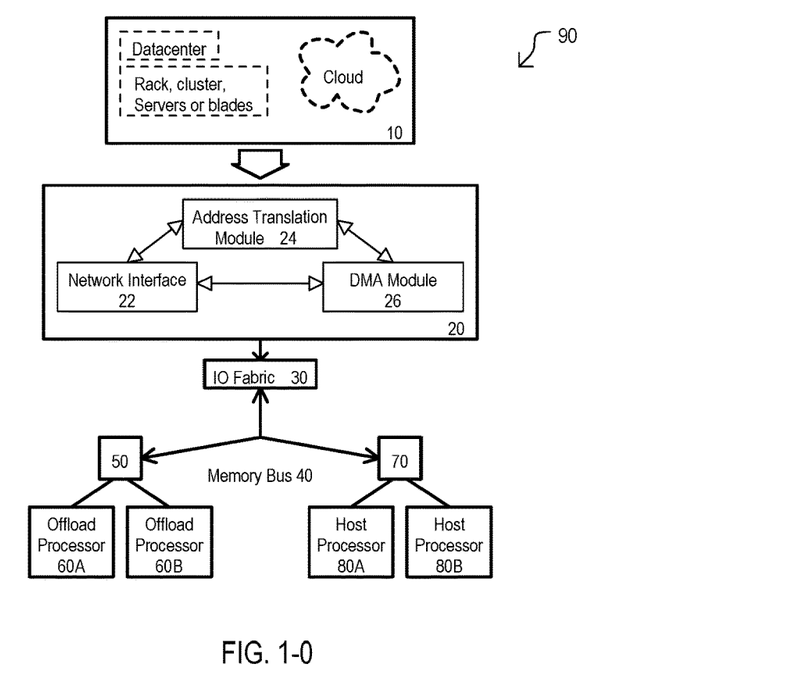

FIG. 1-0 is a diagram of a network overlay system 90 according to an embodiment. A system 90 can provide network overlay services, and can include a data source 10, a data transport module 20, an input/output (IO) fabric 30, a memory bus interconnect 40, one or more offload processing modules 50, and host processor support module 70.

A data source 10 can provide data via any suitable source, such as the Internet, cloud, inter- or intra-data center networks, cluster computers, rack systems, multiple or individual servers or personal computers, or the like. Data from data source 10 can be packet or switch based. In one preferred embodiment, non-packet data is generally converted or encapsulated into packets for ease of handling.

Data from data source 10 can be is passed through data transport module 20. Data transport module 20 can include a network interface 22, an address translation module 24, and first direct memory address (DMA) module 26. Typically, the data can be packetized or converted into a particular packet format supported by IO fabric 30 and memory bus interconnect 40. Both an offload processing module 50 and a host processor support module 70 (which can include a DMA controller) can be connected to the memory bus interconnect 40. Data transport module 20 can be an integrated or separately attached subsystem that includes modules or components such as network interface 22, address translation module 24, and a first DMA module 26.

For packets identified by a logical network identifier or other suitable indicator of network overlay services, address translation module 24 can direct such packets to the offload processing module 50, where offload processors can add or subtract packet metadata, encapsulate or decapsulate packets, provide hardware address or location conversions, or any required network overlay services. Advantageously, little or no processing is required of any host processor (80A or 80B) within host processor support module 70, to enable such a module to be free to continue with its own processing operations.

Referring still to FIG. 1-0, in some embodiments, IO fabric 30 can be based on conventional input/output busses such as peripheral component interconnect (PCI), Fibre Channel, and the like. Memory bus interconnect 40 can be based on existing standard (e.g., JEDEC standards), on DIMM data transfer protocols, on Hypertransport, or any other high speed, low latency interconnection system.

Offload processing Module 50 may include DDR dynamic RAM (DRAM), reduced latency DRAM (RLDRAM), embedded DRAM, next generation stacked memory such as Hybrid Memory Cube (HMC), flash, or other suitable memory. Offload processing module can also include separate logic or bus management chips, programmable units such as field programmable gate arrays (FPGAs), custom designed application specific integrated circuits (ASICs), and an energy efficient, general purpose processor (60A and 60B) such as those based on ARM, ARC, Tensilica, MIPS, Strong/ARM, or RISC architectures, to name a few.

Host processor support module 70 can include one or more general purpose processors (80A, 80B), including those based on Intel or AMD x86 architectures, Intel Itanium architecture, MIPS architecture, or a SPARC architecture, or the like.

Figure 11:
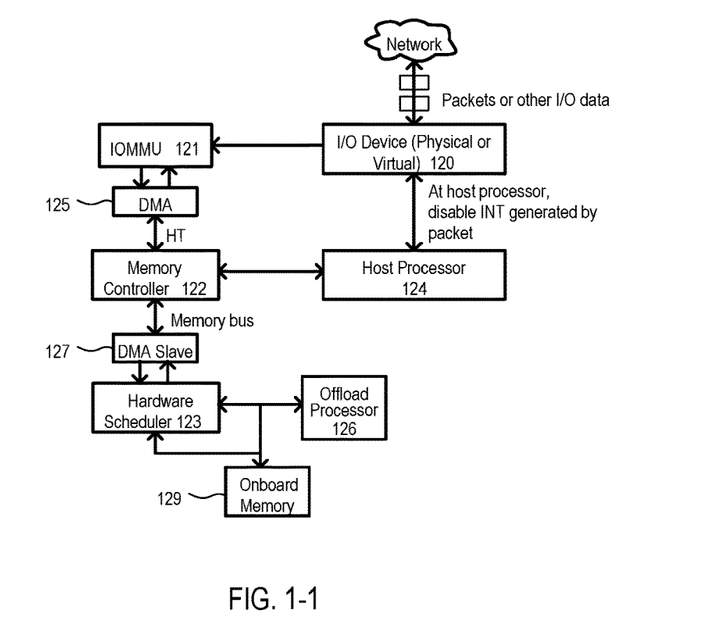

FIG. 1-1 is a system flow diagram of according to another embodiment. FIG. 1-1 shows a server system with a memory bus connected an offload processor, able to support various network overlay operations on packet or other I/O data. Packet or other I/O data can be received at an I/O device 120. An I/O device can be physical device, virtual device or combination thereof. In the particular embodiment shown, selected interrupt generated from the I/O data intended for a host processor 124 can be disabled, allowing such I/O data to be processed without resources of the host processor 124.

An input output memory management unit (IOMMU) 121 can map received data to physical addresses of a system address space. A DMA master 125 can transmit such data to such memory addresses by operation of a memory controller 122. Memory controller 122 can execute memory transfers (e.g., DRAM transfers) over a memory bus with a DMA Slave 127. Upon receiving transferred I/O data, a hardware scheduler 123 can schedule processing of such data with an offload processor 126. In some embodiments, a type of processing can be indicated by metadata within the I/O data. Further, in some embodiments such data can be stored in an onboard memory 129. According to instructions from hardware scheduler 123, one or more offload processors 126 can execute computing functions in response to the I/O data, including but not limited to operations on packets redirected for network overlay. In some embodiments, such computing functions can operate on the I/O data, and such data can be subsequently read out on memory bus via a read request processed by DMA slave 127.

Various features, advantages and/or improvements that can be provided by embodiments herein, can be understood with reference to existing computing architectures. Parallelization of tasks into multiple thread contexts can provide for increased throughput. Processors architectures such as MIPS may include deep instruction pipelines to improve the number of instructions per cycle. Further, the ability to run a multi-threaded programming environment results in enhanced usage of existing processor resources. To further increase parallel execution on the hardware, processor architectures may include multiple processor cores. Multi-core architectures comprising the same type of cores, referred to as homogeneous core architectures, provide higher instruction throughput by parallelizing threads or processes across multiple cores. However, in such homogeneous core architectures, the shared resources, such as memory, are amortized over a small number of processors.

Memory and I/O accesses can incur a high amount of processor overhead. Further, context switches in conventional general purpose processing units can be computationally intensive. It is therefore desirable to reduce context switch overhead in a networked computing resource handling a plurality of networked applications in order to increase processor throughput. Conventional server loads can require complex transport, high memory bandwidth, extreme amounts of data bandwidth (randomly accessed, parallelized, and highly available), but often with light touch processing: HTML, video, packet-level services, security, and analytics. Further, idle processors still consume more than 50% of their peak power consumption.

In contrast to the above, according to embodiments herein, complex transport, data bandwidth intensive, frequent random access oriented, 'light' touch processing loads can be handled behind a socket abstraction created on multiple offload processor cores. At the same time, "heavy" touch, computing intensive loads can be handled by a socket abstraction on a host processor core (e.g., x86 processor cores). Such software sockets can allow for a natural partitioning of these loads between offload processor cores and host processor cores. By usage of new application level sockets, according to embodiments, server loads can be broken up across the offload processing cores and the host processing cores.

Figure 12:
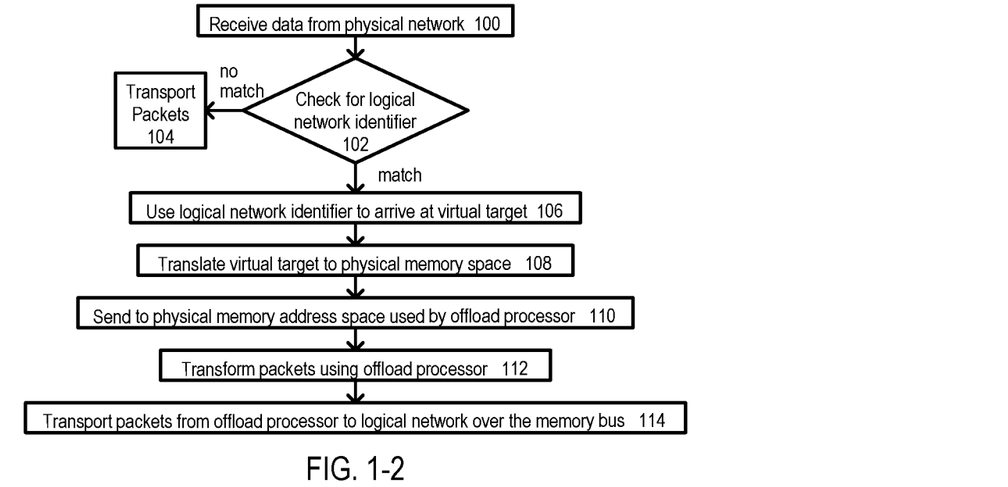

FIG. 1-2 is a flow chart showing a method of providing network overlay services according to a particular embodiment. Incoming packets or data can be received from a physical network 100, which can include, but is not limited to: a wired, a wireless, an optical, a switched, or a packet based networks. Packets without one or more particular logical network identifiers can be transported as required by protocol (104).

Packets with an appropriate logical network identifier can be segregated for further processing (102). Such processing can include determination of a particular virtual target (106) on the network, and the appropriate translation into a physical memory space (108). The packet can then be sent to a physical memory address space used by an offload processor (110). Packets can then be transformed (112) in some manner by the offload processor, and transported back onto a logical network over the memory bus (114).

Figure 13:
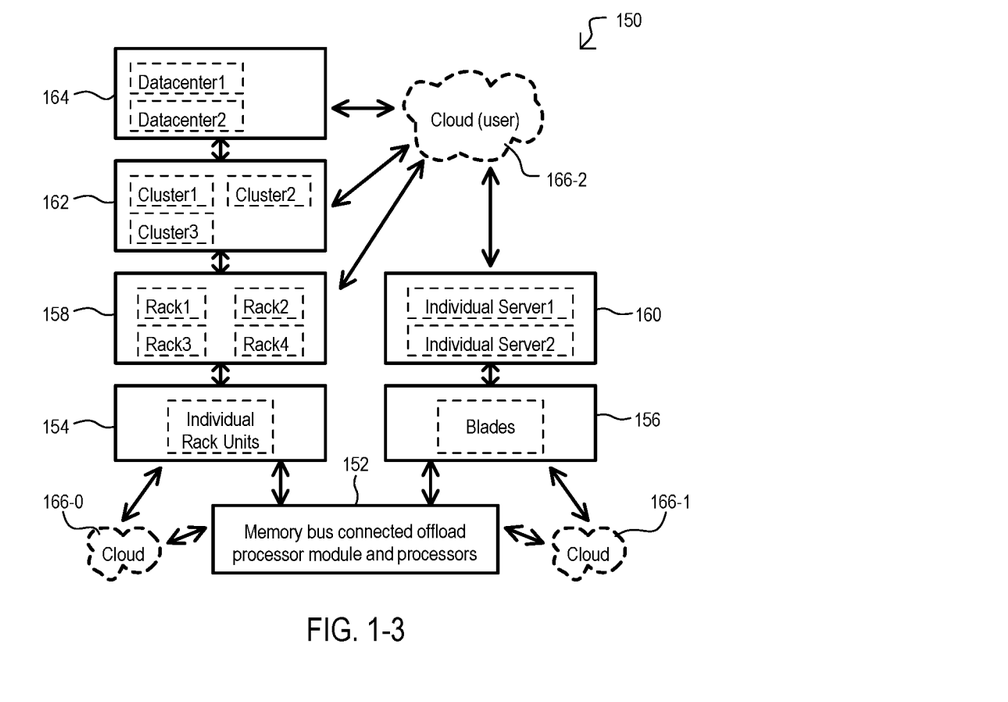

FIG. 1-3 is a diagram showing a data transport system 150 providing network overlay services for multiple networks, servers, and devices, according to an embodiment. The system 150 can include using offload processors connected to a memory bus via an offload processor module 152, as described herein, or equivalents. Such an arrangement can utilize hardware and logic capable of memory bus mediated data modification using such offload processors.

As shown in FIG. 1-3, memory bus connected offload processor module(s) 152 can reside on individual server rack units 154 and/or blade server units 156. Such units (154, 156) can, in turn, form part of or reside in, groups of racks 158 or server systems 160. These can be further grouped into computing clusters 162 or datacenters 164, which can be spatially located in the same building, in the same city, or even in different countries. Any grouping level can be connected to each other, and/or connected to public or private cloud networks (166-0, 166-1).

In operation, data (e.g., packets) can be received from a user via a public or private network (166-2). Such data can be tagged, or otherwise include a particular network identifier. Servers of system 150 can detect the network identifier, and send the packets (or portions thereof) to offload processor module(s) 152 for modification, as described herein, or in an equivalent manner.

FIGS. 2-0 to 2-5 show modules and systems that can be included in the embodiments to provide overlay services as described herein, or equivalents. In particular embodiments, such modules and systems can include DIMM mountable modules to support offload processing.

Figure 20:
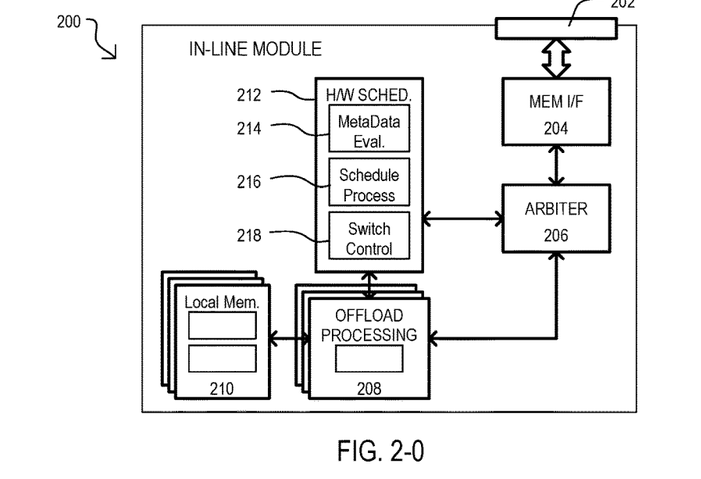

FIG. 2-0 is a block diagram of a processing module 200 according to one embodiment. A processing module 200 can include a physical connector 202, a memory interface 204, arbiter logic 206, offload processor(s) 208, local memory 210, and control logic 212. A connector 202 can provide a physical connection to system memory bus. This is in contrast to a host processor which can access a system memory bus via a memory controller, or the like. In very particular embodiments, a connector 202 can be compatible with a dual in-line memory module (DIMM) slot of a computing system. Accordingly, a system including multiple DIMM slots can be populated with one or more processing modules 200, or a mix of processing modules and DIMM modules.

A memory interface 204 can detect data transfers on a system memory bus, and in appropriate cases, enable write data to be stored in the processing module 200 and/or read data to be read out from the processing module 200. Such data transfers can include the receipt of packet data having a particular network identifier. In some embodiments, a memory interface 204 can be a slave interface, thus data transfers are controlled by a master device separate from the processing module 200. In very particular embodiments, a memory interface 204 can be a direct memory access (DMA) slave, to accommodate DMA transfers over a system memory bus initiated by a DMA master. In some embodiments, a DMA master can be a device different from a host processor. In such configurations, processing module 200 can receive data for processing (e.g., DMA write), and transfer processed data out (e.g., DMA read) without consuming host processor resources. In very particular embodiments, packet data is received, modified, and then output.

Arbiter logic 206 can arbitrate between conflicting accesses of data within processing module 200. In some embodiments, arbiter logic 206 can arbitrate between accesses by offload processor 208 and accesses external to the processor module 200. It is understood that a processing module 200 can include multiple locations that are operated on at the same time. In addition, accesses arbitrated by arbiter logic 206 can include accesses to physical system memory space occupied by the processor module 200, as well as accesses to other resources (e.g., cache memory of offload or host processor). Accordingly, arbitration rules for arbiter logic 206 can vary according to application. In some embodiments, such arbitration rules are fixed for a given processor module 200. In such cases, different applications can be accommodated by switching out different processing modules. However, in alternate embodiments, such arbitration rules can be configurable.

Offload processor 208 can include one or more processors that can operate on data transferred over the system memory bus. In some embodiments, offload processors can run a general operating system or server applications such as Apache (as but one very particular example), enabling processor contexts to be saved and retrieved. Computing tasks executed by offload processor 208 can be handled by the hardware scheduler 212. Offload processors 208 can operate on data buffered in the processor module 200. In addition or alternatively, offload processors 208 can access data stored elsewhere in a system memory space. In some embodiments, offload processors 208 can include a cache memory configured to store context information. An offload processor 208 can include multiple cores or one core.

A processor module 200 can be included in a system having a host processor (not shown). In some embodiments, offload processors 208 can be a different type of processor as compared to the host processor. In particular embodiments, offload processors 208 can consume less power and/or have less computing power than a host processor. In very particular embodiments, offload processors 208 can be "wimpy" core processors, while a host processor can be a "brawny" core processor. However, in alternate embodiments, offload processors 208 can have equivalent computing power to any host processor. In very particular embodiments, a host processor can be an x86 type processor, while an offload processor 208 can include an ARM, ARC, Tensilica, MIPS, Strong/ARM, or RISC type processor, as but a few examples.

Local memory 210 can be connected to offload processor 208 to enable the storing of context information. Accordingly, an offload processor 208 can store current context information, and then switch to a new computing task, then subsequently retrieve the context information to resume the prior task. In very particular embodiments, local memory 210 can be a low latency memory with respect to other memories in a system. In some embodiments, storing of context information can include copying an offload processor 208.

In some embodiments, a same space within local memory 210 is accessible by multiple offload processors 208 of the same type. In this way, a context stored by one offload processor can be resumed by a different offload processor.

Control logic 212 can control processing tasks executed by offload processor(s). In some embodiments, control logic 212 can be considered a hardware scheduler that can be conceptualized as including a data evaluator 214, scheduler 216 and a switch controller 218. A data evaluator 214 can extract "metadata" from write data transferred over a system memory bus. "Metadata", as used herein, can be any information embedded at one or more predetermined locations of a block of write data that indicates processing to be performed on all or a portion of the block of write data and/or indicate a particular task/process to which the data belongs (e.g., classification data). In some embodiments, metadata can be data that indicates a higher level organization for the block of write data. As but one very particular embodiment, metadata can be header information of one or more network packets (which may or may not be encapsulated within a higher layer packet structure).

A scheduler 216 can order computing tasks for offload processor(s) 208. In some embodiments, scheduler 216 can generate a schedule that is continually updated as write data for processing is received. In very particular embodiments, a scheduler 216 can generate such a schedule based on the ability to switch contexts of offload processor(s) 208. In this way, on-module computing priorities can be adjusted on the fly. In very particular embodiments, a scheduler 216 can assign a portion of physical address space (e.g., memory locations within local memory 210) to an offload processor 208, according to computing tasks. The offload processor 208 can then switch between such different spaces, saving context information prior to each switch, and subsequently restoring context information when returning to the memory space.

Switch controller 218 can control computing operations of offload processor(s) 208. In particular embodiments, according to scheduler 216, switch controller 218 can order offload processor(s) 208 to switch contexts. It is understood that a context switch operation can be an "atomic" operation, executed in response to a single command from switch controller 218. In addition or alternatively, a switch controller 218 can issue an instruction set that stores current context information, recalls context information, etc.

In some embodiments, processor module 200 can include a buffer memory (not shown). A buffer memory can store received write data on board the processor module. A buffer memory can be implemented on an entirely different set of memory devices, or can be a memory embedded with logic and/or the offload processor. In the latter case, arbiter logic 206 can arbitrate access to the buffer memory. In some embodiments, a buffer memory can correspond to a portion of a system physical memory space. The remaining portion of the system memory space can correspond to other like processor modules and/or memory modules connected to the same system memory bus. In some embodiments buffer memory can be different than local memory 210. For example, buffer memory can have a slower access time than local memory 210. However, in other embodiments, buffer memory and local memory can be implemented with like memory devices.

In very particular embodiments, write data for processing can have an expected maximum flow rate. A processor module 200 can be configured to operate on such data at, or faster than, such a flow rate. In this way, a master device (not shown) can write data to a processor module without danger of overwriting data "in process".

The various computing elements of a processor module 200 can be implemented as one or more integrated circuit devices (ICs). It is understood that the various components shown in FIG. 2-0 can be formed in the same or different ICs. For example, control logic 212, memory interface 214, and/or arbiter logic 206 can be implemented on one or more logic ICs, while offload processor(s) 208 and local memory 210 are separate ICs. Logic ICs can be fixed logic (e.g., application specific ICs), programmable logic (e.g., field programmable gate arrays, FPGAs), or combinations thereof.

Advantageously, the foregoing hardware and systems can provide improved computational performance as compared to traditional computing systems. Conventional systems, including those based on x86 processors, are often ill-equipped to handle such high volume applications. Even idling, x86 processors use a significant amount of power, and near continuous operation for high bandwidth packet analysis or other high volume processing tasks makes the processor energy costs one of the dominant price factors.

In addition, conventional systems can have issues with the high cost of context switching wherein a host processor is required to execute instructions which can include switching from one thread to another. Such context switching can require storing and recalling of context for the thread. If such context data is resident in a host cache memory, such a context switch can occur relatively quickly. However, if such context data is no longer in cache memory (i.e., a cache miss), the data must be recalled from system memory, which can incur a multi-cycle latency. Continuous cache misses during context switching can adversely impact system performance.

Figure 21:
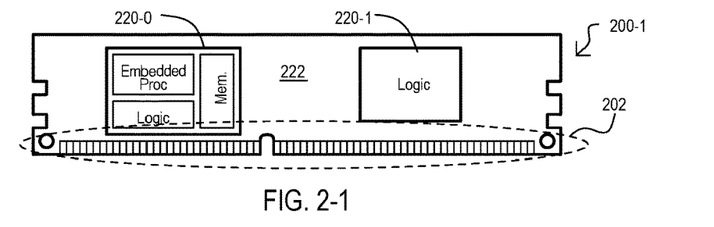

FIG. 2-1 shows a processor module 200-1 according to one very particular embodiment which is capable of reducing issues associated with high volume processing or context switching associated with many conventional server systems. A processor module 200-1 can include ICs 220-0/1 mounted to a printed circuit board (PCB) type substrate 222. PCB type substrate 222 can include in-line module connector 202, which in one very particular embodiment, can be a DIMM compatible connector. IC 220-0 can be a system-on-chip (SoC) type device, integrating multiple functions. In the very particular embodiment shown, an IC 220-0 can include embedded processor(s), logic and memory. Such embedded processor(s) can be offload processor(s) 208 as described herein, or equivalents. Such logic can be any of controller logic 212, memory interface 204 and/or arbiter logic 206, as described herein, or equivalents. Such memory can be any of local memory 210, cache memory for offload processor(s) 208, or buffer memory, as described herein, or equivalents. Logic IC 220-1 can provide logic functions not included in IC 220-0.

Figure 22:
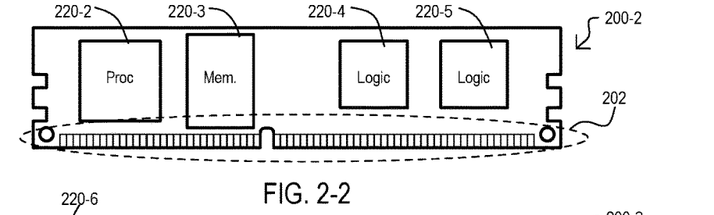

FIG. 2-2 shows a processor module 200-2 according to another very particular embodiment. A processor module 200-2 can include ICs 220-2, -3, -4, -5 mounted to a PCB type substrate 222, like that of FIG. 2-1. However, unlike FIG. 2-1, processor module functions are distributed among single purpose type ICs. IC 220-2 can be a processor IC, which can be an offload processor 208. IC 220-3 can be a memory IC which can include local memory 210, buffer memory, or combinations thereof. IC 220-4 can be a logic IC which can include control logic 212, and in one very particular embodiment, can be an FPGA. IC 220-5 can be another logic IC which can include memory interface 204 and arbiter logic 206, and in one very particular embodiment, can also be an FPGA.

It is understood that FIGS. 2-1/2 represent but two of various implementations. The various functions of a processor module can be distributed over any suitable number of ICs, including a single SoC type IC.

Figure 23:
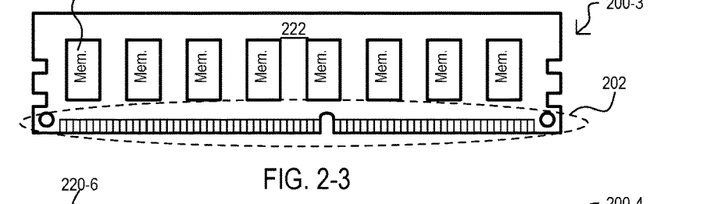

FIG. 2-3 shows an opposing side of a processor module 200-1 or 200-2 according to a very particular embodiment. Processor module 200-3 can include a number of memory ICs, one shown as 220-6, mounted to a PCB type substrate 222, like that of FIG. 2-1. It is understood that various processing and logic components can be mounted on an opposing side to that shown. A memory IC 220-6 can be configured to represent a portion of the physical memory space of a system. Memory ICs 220-6 can perform any or all of the following functions: operate independently of other processor module components, providing system memory accessed in a conventional fashion; serve as buffer memory, storing write data that can be processed with other processor module components, or serve as local memory for storing processor context information.

Figure 24:
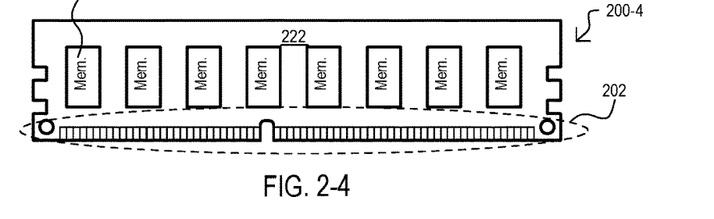

FIG. 2-4 shows a conventional DIMM module (i.e., it serves only a memory function) that can populate a memory bus along with processor modules as described herein, or equivalents.

Figure 25:
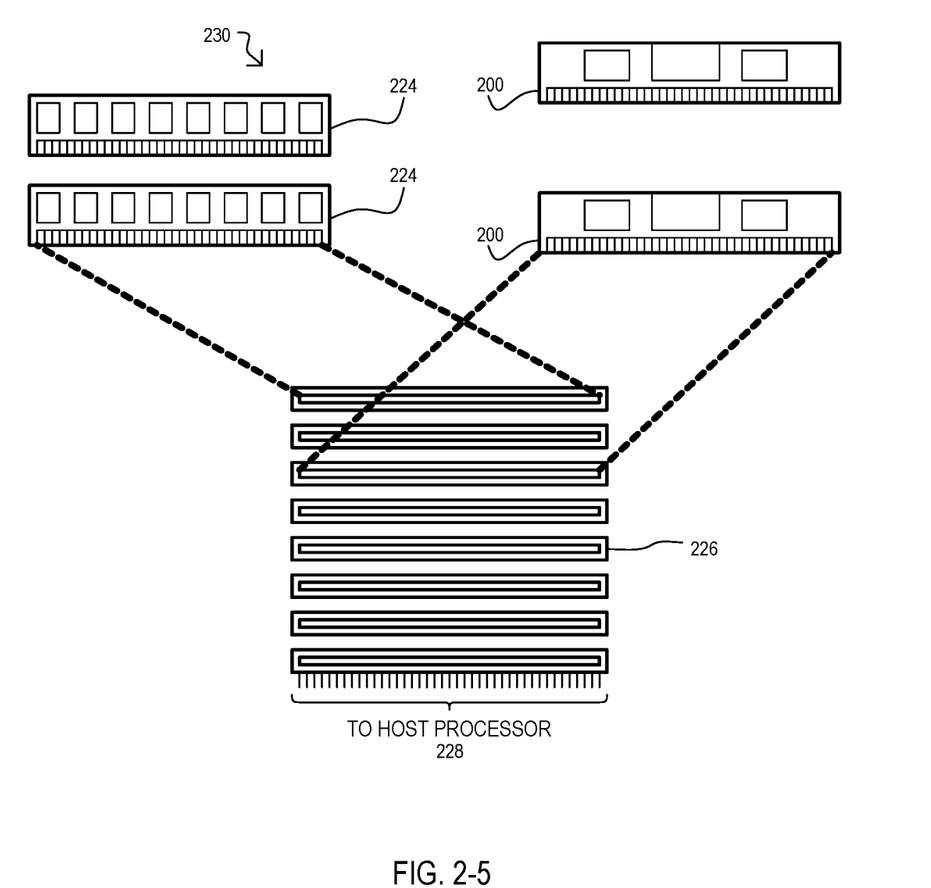

FIG. 2-5 shows a system 230 according to one embodiment. A system 230 can include a system memory bus 228 accessible via multiple in-line module slots (one shown as 226). According to embodiments, any or all of the slots 226 can be occupied by a processor module 200 as described herein, or an equivalent. In the event all slots 226 are not occupied by a processor module 200, available slots can be occupied by conventional in-line memory modules 224. In a very particular embodiment, slots 226 can be DIMM slots.

In some embodiments, a processor module 200 can occupy one slot. However, in other embodiments, a processor module can occupy multiple slots.

In some embodiments, a system memory bus 228 can be further interfaced with one or more host processors and/or input/output device (not shown).

Having described processor modules according to various embodiments, operations of an offload processor module capable of interfacing with server or similar system via a memory bus and according to a particular embodiment will now be described.

Figure 3:
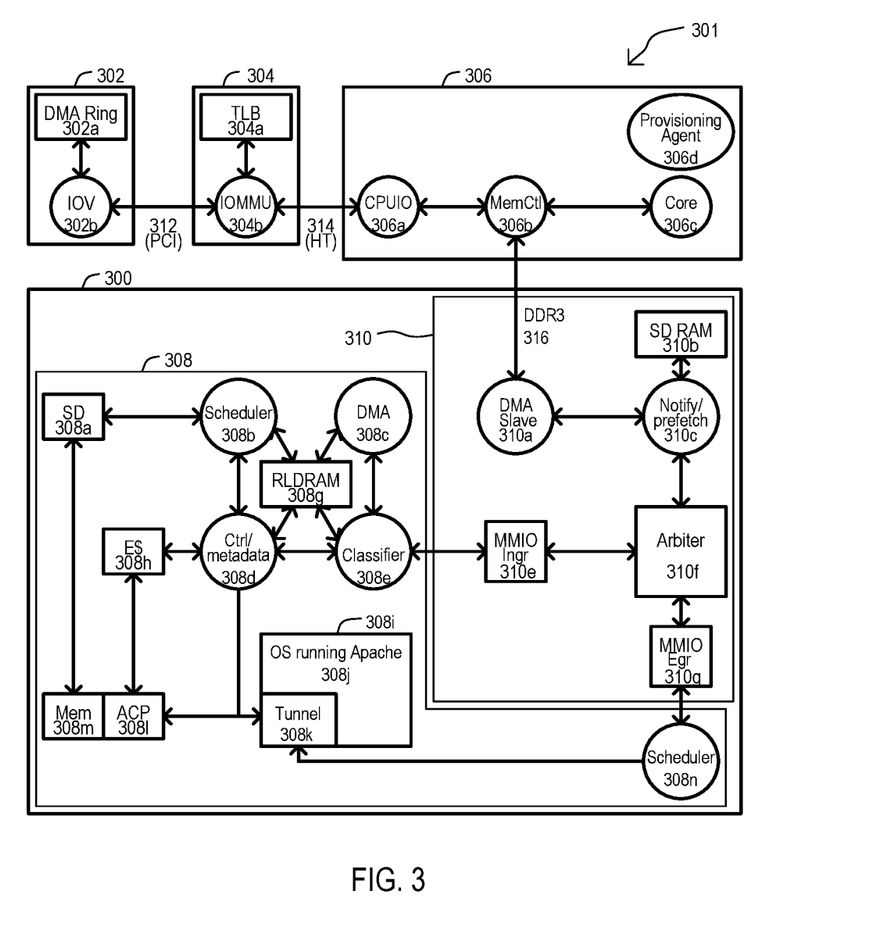
FIG. 3 shows one particular implementation of a memory bus connected offload processor capable of supporting packet conversion services for network overlay that can be included in embodiments.

FIG. 3 shows a system 301 according to another embodiment. A system 301 can transport packet data requiring network overlay services to one or more computational units (one shown as 300) located on a module, which in particular embodiments, can include a connector compatible with an existing memory module. In some embodiments, a computational unit 300 can include a processor module as described in embodiments herein, or an equivalent. A computational unit 300 can be capable of intercepting or otherwise accessing packets sent over a memory bus 316 and carrying out processing on such packets, including but not limited to termination or metadata processing. A system memory bus 316 can be a system memory bus like those described herein, or equivalents (e.g., 228).

Referring still to FIG. 3, a system 301 can include an I/O device 302 which can receive packet or other I/O data from an external source. In some embodiments I/O device 302 can include physical or virtual functions generated by the physical device to receive a packet or other I/O data from the network or another computer or virtual machine. In the very particular embodiment shown, an I/O device 302 can include a network interface card (NIC) having input buffer 302a (e.g., DMA ring buffer) and an I/O virtualization function 302b.

According to embodiments, an I/O device 302 can write a descriptor including details of the necessary memory operation for the packet (i.e. read/write, source/destination). Such a descriptor can be assigned a virtual memory location (e.g., by an operating system of the system 301). I/O device 302 then communicates with an input output memory management unit (IOMMU) 304 which can translate virtual addresses to corresponding physical addresses with an IOMMU function 304b. In the particular embodiment shown, a translation look-aside buffer (TLB) 304a can be used for such translation. Virtual function reads or writes data between I/O device and system memory locations can then be executed with a direct memory transfer (e.g., DMA) via a memory controller 306b of the system 301. An I/O device 302 can be connected to IOMMU 304 by a host bus 312. In one very particular embodiment, a host bus 312 can be a peripheral interconnect (PCI) type bus. IOMMU 304 can be connected to a host processing section 306 at a central processing unit I/O (CPUIO) 306a. In the embodiment shown, such a connection 314 can support a HyperTransport (HT) protocol.

In the embodiment shown, a host processing section 306 can include the CPUIO 306a, memory controller 306b, processing core 306c and corresponding provisioning agent 306d.

In particular embodiments, a computational unit 300 can interface with the system bus 316 via standard in-line module connection, which in very particular embodiments can include a DIMM type slot. In the embodiment shown, a memory bus 316 can be a DDR3 type memory bus. Alternate embodiments can include any suitable system memory bus. Packet data can be sent by memory controller 306b via memory bus 316 to a DMA slave interface 310a. DMA slave interface 310a can be adapted to receive encapsulated read/write instructions from a DMA write over the memory bus 316.

A hardware scheduler (308b/c/d/e/h) can perform traffic management on incoming packets by categorizing them according to flow using session metadata. Packets can be queued for output in an onboard memory (310b/308a/308m) based on session priority. When the hardware scheduler determines that a packet for a particular session is ready to be processed by the offload processor 308i, the onboard memory is signaled for a context switch to that session. Utilizing this method of prioritization, context switching overhead can be reduced, as compared to conventional approaches. That is, a hardware scheduler can handle context switching decisions and thus optimize the performance of the downstream resource (e.g., offload processor 308$i$).

As noted above, in very particular embodiments, an offload processor 308$i$ can be a "wimpy core" type processor. According to some embodiments, a host processor 306$c$ can be a "brawny core" type processor (e.g., an x86 or any other processor capable of handling "heavy touch" computational operations). While an I/O device 302 can be configured to trigger host processor interrupts in response to incoming packets, according to embodiments, such interrupts can be disabled, thereby reducing processing overhead for the host processor 306$c$. In some very particular embodiments, an offload processor 308$i$ can include an ARM, ARC, Tensilica, MIPS, Strong/ARM or any other processor capable of handling "light touch" operations. Preferably, an offload processor can run a general purpose operating system for executing a plurality of sessions, which can be optimized to work in conjunction with the hardware scheduler in order to reduce context switching overhead.

Referring still to FIG. 3, in operation, a system 301 can receive packets from an external network over a network interface. The packets are destined for either a host processor 306$c$ or an offload processor 308$i$ based on the classification logic and schematics employed by I/O device 302. In particular embodiments, I/O device 302 can operate as a virtualized NIC, with packets for a particular logical network or to a certain virtual MAC (VMAC) address can be directed into separate queues and sent over to the destination logical entity. Such an arrangement can transfer packets to different entities. In some embodiments, each such entity can have a virtual driver, a virtual device model that it uses to communicate with connected virtual network.

According to embodiments, multiple devices can be used to redirect traffic to specific memory addresses. So, each of the network devices operates as if it is transferring the packets to the memory location of a logical entity. However, in reality, such packets are transferred to memory addresses where they can be handled by one or more offload processors (e.g., 308$i$). In particular embodiments such transfers are to physical memory addresses, thus logical entities can be removed from the processing, and a host processor can be free from such packet handling.

Accordingly, embodiments can be conceptualized as providing a memory "black box" to which specific network data can be fed. Such a memory black box can handle the data (e.g., process it) and respond back when such data is requested.

Referring still to FIG. 3, according to some embodiments, I/O device 302 can receive data packets from a network or from a computing device. The data packets can have certain characteristics, including transport protocol number, source and destination port numbers, source and destination IP addresses, for example. The data packets can further have metadata that is processed (308$d$) that helps in their classification and management.

I/O device 302 can include, but is not limited to, peripheral component interconnect (PCI) and/or PCI express (PCIe) devices connecting with a host motherboard via PCI or PCIe bus (e.g., 312). Examples of I/O devices include a network interface controller (NIC), a host bus adapter, a converged network adapter, an ATM network interface, etc.

In order to provide for an abstraction scheme that allows multiple logical entities to access the same I/O device 302, the I/O device may be virtualized to provide for multiple virtual devices each of which can perform some of the functions of the physical I/O device. The IO virtualization program (e.g., 302$b$) according to an embodiment, can redirect traffic to different memory locations (and thus to different offload processors attached to modules on a memory bus). To achieve this, an I/O device 302 (e.g., a network card) may be partitioned into several function parts; including controlling function (CF) supporting input/output virtualization (IOV) architecture (e.g., single-root IOV) and multiple virtual function (VF) interfaces. Each virtual function interface may be provided with resources during runtime for dedicated usage. Examples of the CF and VF may include the physical function and virtual functions under schemes such as Single Root I/O Virtualization or Multi-Root I/O Virtualization architecture. The CF acts as the physical resources that sets up and manages virtual resources. The CF is also capable of acting as a full-fledged IO device. The VF is responsible for providing an abstraction of a virtual device for communication with multiple logical entities/multiple memory regions.

The operating system/the hypervisor any of the virtual machines/user code running on a host processor 306$c$ may be loaded with a device model, a VF driver and a driver for a CF. The device model may be used to create an emulation of a physical device for the host processor 306$c$ to recognize each of the multiple VFs that are created. The device model may be replicated multiple times to give the impression to a VF driver (a driver that interacts with a virtual IO device) that it is interacting with a physical device of a particular type.

For example, a certain device module may be used to emulate a network adapter such as the Intel® Ethernet Converged Network Adapter (CNA) X540-T2, so that the I/O device 302 believes it is interacting with such an adapter. In such a case, each of the virtual functions may have the capability to support the functions of the above said CNA, i.e., each of the Physical Functions should be able to support such functionality. The device model and the VF driver can be run in either privileged or non-privileged mode. In some embodiments, there is no restriction with regard to who hosts/runs the code corresponding to the device model and the VF driver. The code, however, has the capability to create multiple copies of device model and VF driver so as to enable multiple copies of said I/O interface to be created.

An application or provisioning agent 306$d$, as part of an application/user level code running in a kernel, may create a virtual I/O address space for each VF, during runtime and allocate part of the physical address space to it. For example, if an application handling the VF driver instructs it to read or write packets from or to memory addresses 0xaaaa to 0xffff, the device driver may write I/O descriptors into a descriptor queue with a head and tail pointer that are changed dynamically as queue entries are filled. The data structure may be of another type as well, including but not limited to a ring structure 302$a$ or hash table.

The VF can read from or write data to the address location pointed to by the driver. Further, on completing the transfer of data to the address space allocated to the driver, interrupts, which are usually triggered to the host processor to handle said network packets, can be disabled. Allocating a specific I/O space to a device can include allocating said IO space a specific physical memory space occupied.

In another embodiment, the descriptor may comprise only a write operation, if the descriptor is associated with a specific data structure for handling incoming packets. Further, the descriptor for each of the entries in the incoming data structure may be constant so as to redirect all data write to a specific memory location. In an alternate embodiment, the descriptor for consecutive entries may point to consecutive entries in memory so as to direct incoming packets to consecutive memory locations.

Alternatively, said operating system may create a defined physical address space for an application supporting the VF drivers and allocate a virtual memory address space to the application or provisioning agent 306d, thereby creating a mapping for each virtual function between said virtual address and a physical address space. Said mapping between virtual memory address space and physical memory space may be stored in IOMMU tables (e.g., a TLB 304a). The application performing memory reads or writes may supply virtual addresses to say virtual function, and the host processor OS may allocate a specific part of the physical memory location to such an application.

Alternatively, VF may be configured to generate requests such as read and write which may be part of a direct memory access (DMA) read or write operation, for example. The virtual addresses can be translated by the IOMMU 304 to their corresponding physical addresses and the physical addresses may be provided to the memory controller for access. That is, the IOMMU 304 may modify the memory requests sourced by the I/O devices to change the virtual address in the request to a physical address, and the memory request may be forwarded to the memory controller for memory access. The memory request may be forwarded over a bus 314 that supports a protocol such as HyperTransport 314. The VF may in such cases carry out a direct memory access by supplying the virtual memory address to the IOMMU 304.

Alternatively, said application may directly code the physical address into the VF descriptors if the VF allows for it. If the VF cannot support physical addresses of the form used by the host processor 306c, an aperture with a hardware size supported by the VF device may be coded into the descriptor so that the VF is informed of the target hardware address of the device. Data that is transferred to an aperture may be mapped by a translation table to a defined physical address space in the system memory. The DMA operations may be initiated by software executed by the processors, programming the I/O devices directly or indirectly to perform the DMA operations.

Referring still to FIG. 3, in particular embodiments, parts of computational unit 300 can be implemented with one or more FPGAs. In the system of FIG. 3, computational unit 300 can include FPGA 310 in which can be formed a DMA slave device module 310a and arbiter 310f. A DMA slave module 310a can be any device suitable for attachment to a memory bus 316 that can respond to DMA read/write requests. In alternate embodiments, a DMA slave module 310a can be another interface capable of block data transfers over memory bus 316. The DMA slave module 310a can be capable of receiving data from a DMA controller (when it performs a read from a 'memory' or from a peripheral) or transferring data to a DMA controller (when it performs a write instruction on the DMA slave module 310a). The DMA slave module 310a may be adapted to receive DMA read and write instructions encapsulated over a memory bus, (e.g., in the form of a DDR data transmission, such as a packet or data burst), or any other format that can be sent over the corresponding memory bus.

A DMA slave module 310a can reconstruct the DMA read/write instruction from the memory R/W packet. The DMA slave module 310a may be adapted to respond to these instructions in the form of data reads/data writes to the DMA master, which could either be housed in a peripheral device, in the case of a PCIe bus, or a system DMA controller in the case of an ISA bus.

I/O data that is received by the DMA device 310a can then be queued for arbitration. Arbitration can include the process of scheduling packets of different flows, such that they are provided access to available bandwidth based on a number of parameters. In general, an arbiter 310f provides resource access to one or more requestors. If multiple requestors request access, an arbiter 310f can determine which requestor becomes the accessor and then passes data from the accessor to the resource interface, and the downstream resource can begin execution on the data. After the data has been completely transferred to a resource, and the resource has competed execution, the arbiter 310f can transfer control to a different requestor and this cycle repeats for all available requestors. In the embodiment of FIG. 3, arbiter 310f can notify other portions of computational unit 300 (e.g., 308) of incoming data.

Alternatively, a computation unit 300 can utilize an arbitration scheme shown in U.S. Pat. No. 7,813,283, issued to Dalal on Oct. 12, 2010, the contents of which are incorporated herein by reference. Other suitable arbitration schemes known in art could be implemented in embodiments herein. Alternatively, the arbitration scheme of the current invention might be implemented using an OpenFlow switch and an OpenFlow controller.

In the very particular embodiment of FIG. 3, computational unit 300 can further include notify/prefetch circuits 310c which can prefetch data stored in a buffer memory 310b in response to DMA slave module 310a, and as arbitrated by arbiter 310f. Further, arbiter 310f can access other portions of the computational unit 300 via a memory mapped I/O ingress path 310e and egress path 310g.

Referring to FIG. 3, a hardware scheduler can include a scheduling circuit 308b/n to implement traffic management of incoming packets. Packets from a certain source, relating to a certain traffic class, pertaining to a specific application or flowing to a certain socket are referred to as part of a session flow and are classified using session metadata. Such classification can be performed by classifier 308e.

In some embodiments, session metadata 308d can serve as the criterion by which packets are prioritized and scheduled and as such, incoming packets can be reordered based on their session metadata. This reordering of packets can occur in one or more buffers and can modify the traffic shape of these flows. The scheduling discipline chosen for this prioritization, or traffic management (TM), can affect the traffic shape of flows and micro-flows through delay (buffering), bursting of traffic (buffering and bursting), smoothing of traffic (buffering and rate-limiting flows), dropping traffic (choosing data to discard so as to avoid exhausting the buffer), delay jitter (temporally shifting cells of a flow by different amounts) and by not admitting a connection (e.g., cannot simultaneously guarantee existing service level agreements (SLAs) with an additional flow's SLA).

According to embodiments, computational unit 300 can serve as part of a switch fabric, and provide traffic management with depth-limited output queues, the access to which is arbitrated by a scheduling circuit 308b/n. Such output queues are managed using a scheduling discipline to provide traffic management for incoming flows. The session flows queued in each of these queues can be sent out through an output port to a downstream network element.

It is noted that conventional traffic management do not take into account the handling and management of data by downstream elements except for meeting the SLA agreements it already has with said downstream elements.

In contrast, according to embodiments a scheduler circuit 308b/n can allocate a priority to each of the output queues and carry out reordering of incoming packets to maintain persistence of session flows in these queues. A scheduler circuit 308b/n can be used to control the scheduling of each of these persistent sessions into a general purpose operating system (OS) 308j, executed on an offload processor 308i. Packets of a particular session flow, as defined above, can belong to a particular queue. The scheduler circuit 308b/n may control the prioritization of these queues such that they are arbitrated for handling by a general purpose (GP) processing resource (e.g., offload processor 308i) located downstream. An OS 308j running on a downstream processor 308i can allocate execution resources such as processor cycles and memory to a particular queue it is currently handling. The OS 308j may further allocate a thread or a group of threads for that particular queue, so that it is handled distinctly by the general purpose (GP) processing element 308i as a separate entity. The fact that there can be multiple sessions running on a GP processing resource, each handling data from a particular session flow resident in a queue established by the scheduler circuit, tightly integrates the scheduler and the downstream resource (e.g., 308i). This can bring about persistence of session information across the traffic management and scheduling circuit and the general purpose processing resource 308i.

Dedicated computing resources (e.g., 308i), memory space and session context information for each of the sessions can provide a way of handling, processing and/or terminating each of the session flows at the general purpose processor 308i. The scheduler circuit 308b/n can exploit this functionality of the execution resource to queue session flows for scheduling downstream. The scheduler circuit 308b/n can be informed of the state of the execution resource(s) (e.g., 308i), the current session that is run on the execution resource; the memory space allocated to it, the location of the session context in the processor cache.

According to embodiments, a scheduler circuit 308b/n can further include switching circuits to change execution resources from one state to another. The scheduler circuit 308b/n can use such a capability to arbitrate between the queues that are ready to be switched into the downstream execution resource. Further, the downstream execution resource can be optimized to reduce the penalty and overhead associated with context switch between resources. This is further exploited by the scheduler circuit 308b/n to carry out seamless switching between queues, and consequently their execution as different sessions by the execution resource.

According to embodiments, a scheduler circuit 308b/n can schedule different sessions on a downstream processing resource, wherein the two are operated in coordination to reduce the overhead during context switches. An important factor in decreasing the latency of services and engineering computational availability can be hardware context switching synchronized with network queuing. In embodiments, when a queue is selected by a traffic manager, a pipeline coordinates swapping in of the cache (e.g., L2 cache) of the corresponding resource (e.g., 308i) and transfers the reassembled I/O data into the memory space of the executing process. In certain cases, no packets are pending in the queue, but computation is still pending to service previous packets. Once this process makes a memory reference outside of the data swapped, the scheduler circuit (308b/n) can enable queued data from an I/O device 302 to continue scheduling the thread.

In some embodiments, to provide fair queuing to a process not having data, a maximum context size can be assumed as data processed. In this way, a queue can be provisioned as the greater of computational resource and network bandwidth resource. As but one very particular example, a computation resource can be an ARM A9 processor running at 800 MHz, while a network bandwidth can be 3 Gbps of bandwidth. Given the lopsided nature of this ratio, embodiments can utilize computation having many parallel sessions (such that the hardware's prefetching of session-specific data offloads a large portion of the host processor load) and having minimal general purpose processing of data.

Accordingly, in some embodiments, a scheduler circuit 308b/n can be conceptualized as arbitrating, not between outgoing queues at line rate speeds, but arbitrating between terminated sessions at very high speeds. The stickiness of sessions across a pipeline of stages, including a general purpose OS, can be a scheduler circuit optimizing any or all such stages of such a pipeline.

Alternatively, a scheduling scheme can be used as shown in U.S. Pat. No. 7,760,715 issued to Dalal on Jul. 20, 2010, incorporated herein by reference. This scheme can be useful when it is desirable to rate limit the flows for preventing the downstream congestion of another resource specific to the over-selected flow, or for enforcing service contracts for particular flows. Embodiments can include arbitration scheme that allows for service contracts of downstream resources, such as general purpose OS that can be enforced seamlessly.

Referring still to FIG. 3, a hardware scheduler according to embodiments herein, or equivalents, can provide for the classification of incoming packet data into session flows based on session metadata. It can further provide for traffic management of these flows before they are arbitrated and queued as distinct processing entities on the offload processors.

In some embodiments, offload processors (e.g., 308i) can be general purpose processing units capable of handling packets of different application or transport sessions. Such offload processors can be low power processors capable of executing general purpose instructions. The offload processors could be any suitable processor, including but not limited to: ARM, ARC, Tensilica, MIPS, StrongARM or any other processor that serves the functions described herein. Such offload processors have a general purpose OS running on them, wherein the general purpose OS is optimized to reduce the penalty associated with context switching between different threads or group of threads.

In contrast, context switches on host processors can be computationally intensive processes that require the register save area, process context in the cache and TLB entries to be restored if they are invalidated or overwritten. Instruction Cache misses in host processing systems can lead to pipeline stalls and data cache misses lead to operation stall and such cache misses reduce processor efficiency and increase processor overhead.

In contrast, an OS 308j running on the offload processors 308i in association with a scheduler circuit 308b/n, can operate together to reduce the context switch overhead incurred between different processing entities running on it. Embodiments can include a cooperative mechanism between a scheduler circuit and the OS on the offload processor 308i, wherein the OS sets up session context to be physically contiguous (physically colored allocator for session heap and stack) in the cache; then communicates the session color, size, and starting physical address to the scheduler circuit upon session initialization. During an actual context switch, a scheduler circuit can identify the session context in the cache by using these parameters and initiate a bulk transfer of these contents to an external low latency memory (e.g., 308g). In addition, the scheduler circuit can manage the prefetch of the old session if its context was saved to a local memory 308g. In particular embodiments, a local memory 308g can be low latency memory, such as a reduced latency dynamic random access memory (RLDRAM), as but one very particular embodiment. Thus, in embodiments, session context can be identified distinctly in the cache.

In some embodiments, context size can be limited to ensure fast switching speeds. In addition or alternatively, embodiments can include a bulk transfer mechanism to transfer out session context to a local memory 308g. The cache contents stored therein can then be retrieved and prefetched during context switch back to a previous session. Different context session data can be tagged and/or identified within the local memory 308g for fast retrieval. As noted above, context stored by one offload processor may be recalled by a different offload processor.

In the very particular embodiment of FIG. 3, multiple offload processing cores can be integrated into a computation FPGA 308. Multiple computational FPGAs can be arbitrated by arbitrator circuits in another FPGA 310. The combination of computational FPGAs (e.g., 308) and arbiter FPGAs (e.g., 310) are referred to as "XIMM" modules or "Xockets DIMM modules" (e.g., computation unit 300). In particular applications, these XIMM modules can provide integrated traffic and thread management circuits that broker execution of multiple sessions on the offload processors.

FIG. 3 also shows an offload processor tunnel connection 308k, as well as a memory interface 308m and port 308l (which can be an accelerator coherency port (ACP)). Memory interface 308m can access buffer memory 308a.

Having described various embodiments suitable for network overlay operations, several examples of such operations will now be described.

Example 1—IPV4 to IPV6 Conversion

Internet Protocol version 6 (IPv6) is the latest version of Internet Protocol (IP), the communications protocol that identifies computers on networks and allows for routing of packet traffic across the Internet. Since every device on the Internet must have a uniquely assigned IP address in order to communicate with other devices, the increasing number of new devices being connected to the Internet requires more addresses than the current Internet protocol IPv4 can support. IPv6 uses a 128-bit address, permitting approximately $3.4 \times 10^{38}$ addresses, far more than the approximately 4.3 billion addresses available under the 32-bit address system of IPv4. Unfortunately, the two protocols are not designed to be interoperable, requiring special procedures for handling packets that must be converted between the protocols.

In this example, instead of using a host or server processor to perform protocol translations as part of a network overlay, one or more offload processor modules can be used. Both encapsulation and decapsulation of packet data can be provided, with IPv6 (which cannot be transported over an IPv4 network) being converted (encapsulated) into IPv4 packets so that they could be transported over a network. Such a conversion includes segmenting packets (if they are too large) and adding any required IPv4 headers and packet identifiers. Once a packet is in IPv4 format, it can be tunneled over a memory bus (e.g., DDR) to a network interface card for transfer over a network. Similarly, decapsulation can be provided by converting IPv4 packets (that contain IPv6 protocol packets as payload) into protocols of IPv6 so that they could be transported to a host processor that has a IPv6 address. The conversion comprises of reassembling packets (if they were segmented) and removing IPv4 headers and any packet identifiers. Once the final packet is in IPv6 format it can be tunneled over DDR or other memory bus to a host processor.

Example 2—VXLan Support

Virtual network equipment presentation such as customer network routers and customer network firewalls can also be achieved using overlay networking technology. For example, Virtual Extensible LAN (VXLAN) based systems are a widely used virtualization scheme that requires specific encapsulation and decapsulation network overlay services. Typically, MAC-based layer 2 Ethernet frames are incorporated within layer 3 UDP packets. In this example, instead of specialized network cards, interface units, or server supported software implementations, an offload processing module can be used for required encapsulation and decapsulation of data.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A network overlay system, comprising:
a data transport module comprising
a network interface configured to connect to a data source and receive network packet data, and
an address translation module configured to generate offload processing physical addresses for network packet data based on identifier information for the network packet data;
a system bus connected to the data transport module;
at least one host processor connected to the system bus; and
at least one offload processor module coupled to the system bus and configured to receive network packet data associated with at least one the offload processing physical addresses, the at least one offload processor module including
processing circuits associated with at least one of the offload processing physical addresses, the offload processing circuits configured to encapsulate the network packet data for transport on a logical network or decapsulate the network packet data received from the logical network, wherein
the offload processing circuits encapsulate or decapsulate network packet data independent of any host processor, and
the logical network is overlaid on a physical network.

2. The system of claim 1, wherein:
the at least one offload processor module comprises a circuit board attached to the system bus;
the processing circuits are mounted on the circuit board; and
no host processor is mounted on the circuit board.

3. The system of claim 2, wherein the processing circuits comprise a programmable logic device.

4. The system of claim 3, wherein the programmable logic device includes a field programmable gate array (FPGA) device.

5. The system of claim 1, wherein:
the processing circuits decapsulate the network packet data and are configured to transform received network packets of a first protocol to decapsulated network packets of a second protocol based on metadata included with the network packet data; and
the at least one offload processing module is configured to transport the decapsulated network packets out of the at least one offload processing module independent of any host processor.

6. The system of claim 5, wherein:
the first protocol is a delivery protocol and the second protocol is a payload protocol.

7. The system of claim 1, wherein:
the processing circuits encapsulate the network packet data and are configured to transform network packets of a second protocol to encapsulated network packets of a first protocol; and
the at least one offload processing module is configured to transport the encapsulated network packets out of the at least one offload processing module independent of any host processor.

8. The system of claim 7, wherein:
the first protocol is a delivery protocol and the second protocol is a payload protocol.

9. A method for providing network overlay services, comprising the steps of:
receiving network packet data from a data source in an offload processor module that is mounted to a system bus of a host server, the host server further including at least one host processor connected to the system bus, and
a network interface device;
encapsulating the network packet data to create encapsulated network packets for transport on a logical network or decapsulating the network packet data to create decapsulated network packets for delivery to a network location, the encapsulating and decapsulating being executed by processing circuits mounted on the offload processor module and being executed independent of any host processor; and
transporting the encapsulated network packets or the decapsulated network packets out of the offload processor module; wherein
the logical network is overlaid on a physical network.

10. The method of claim 9, wherein:
the offload processor module comprises a circuit board attached to the system bus on which the processing circuits are mounted; and
no host processor is mounted on the circuit board.

11. The method of claim 10, wherein the processing circuits comprise a programmable logic device.

12. The method of claim 11, wherein the programmable logic device includes a field programmable gate array (FPGA) device.

13. The method of claim 9, wherein:
the encapsulated network packets comprise IPv4 network packets created from IPv6 network packets; and
the decapsulated network packets comprise IPv6 network packets removed from IPv4 network packets.

14. The method of claim 9, further including transmitting the encapsulated network packets or decapsulated network packets back to the data source.

15. A system, comprising:
a plurality of computing nodes interconnected to one another by a communication network, each computing node including at least one hardware (hw) accelerated server;
each hw accelerated server including
at least one system bus,
at least one host processor coupled to the at least one system bus,
at least one network interface coupled to the at least one system bus, and
at least one hw accelerator module coupled to the at least one system bus,
each hw accelerator module being attachable to its at least one system bus and having processing circuits formed thereon, the processing circuits configured to
encapsulate network packet data received by the hw accelerated server to form network packets of a second protocol from network packets of a first protocol, or
decapsulate network packet data received by the hw accelerated server to form network packets of the first protocol from network packets of the second protocol, wherein
the processing circuits encapsulate and decapsulate network packet data independent of any host processor, and
no host processor is formed on the hw accelerator module.

16. The system of claim 15, wherein the processing circuits comprise a programmable logic device.

17. The system of claim 16, wherein the programmable logic device includes a field programmable gate array (FPGA) device.

18. The system of claim 15, wherein the first protocol is a payload protocol and the second protocol is a delivery protocol.

19. The system of claim 15, wherein the first protocol is IPv6 and the second protocol is IPv4.

20. The system of claim 15, wherein the hw accelerator module is configured to transport the network packets of the first or second protocol out of the hw accelerator module.

* * * * *